(12) United States Patent
Boult et al.

(10) Patent No.: US 7,623,685 B2
(45) Date of Patent: Nov. 24, 2009

(54) BIOMETRIC SIGNATURES AND IDENTIFICATION THROUGH THE USE OF PROJECTIVE INVARIANTS

(75) Inventors: Terrance Edward Boult, Monument, CO (US); Gang Zheng, Erie, PA (US); Chia-Jiu Wang, Colorado Springs, CO (US)

(73) Assignee: The Regents of the University of Colorado, Boulder, CO (US)

( * ) Notice: Subject to any disclaimer, the term of this patent is extended or adjusted under 35 U.S.C. 154(b) by 311 days.

(21) Appl. No.: 11/659,640

(22) PCT Filed: Aug. 19, 2005

(86) PCT No.: PCT/US2005/029923
§ 371 (c)(1),
(2), (4) Date: Feb. 5, 2007

(87) PCT Pub. No.: WO2006/135394
PCT Pub. Date: Dec. 21, 2006

(65) Prior Publication Data
US 2007/0274574 A1 Nov. 29, 2007

Related U.S. Application Data

(60) Provisional application No. 60/603,304, filed on Aug. 20, 2004.

(51) Int. Cl.
*G06K 9/00* (2006.01)
(52) U.S. Cl. .................... 382/115; 382/276
(58) Field of Classification Search ............ 382/115
See application file for complete search history.

(56) References Cited

U.S. PATENT DOCUMENTS 5,548,667 A * 8/1996 Tu ........................ 382/285

(Continued)

OTHER PUBLICATIONS

Gee, A., Cipolla, R., "Estimating gaze from a single view of a face", Pattern Recognition, 1994. vol. 1—Conference A: Computer Vision & Image Processing., Proceedings of the 12th IAPR International Conference on, Oct. 9-13, 1994, vol. 1, On pp. 758-760 vol. 1, ISBN: 0-8186-6265-4.*

(Continued)

*Primary Examiner*—Matthew C. Bella
*Assistant Examiner*—Sath V. Perungavoor
(74) *Attorney, Agent, or Firm*—Dale B. Halling

(57) ABSTRACT

Techniques, systems and methods for obtaining biometric signatures and identification are described. Broadly stated, embodiments of the present invention utilize specified geometric principles to provide means for accurate biometric identification using projective invariant features of a subregion of the human body. The present invention provides a means for computing biometric signatures and identification that are projective invariant and hence are not impacted by the viewing angle of the subregion of the human body containing the biometric data. This novel invention removes the restriction, often implicit in the previous work, of the imaging or sensing system being in a fixed repeatable (and generally orthogonal) viewing position. This invention can be applied across a wide range of biometrics, although it is most easily applicable to features that are approximately co-planar. A plurality of such projective invariant features can be used to define a biometric signature to either verify an individual's identity, or recognize an individual from a database of already known persons.

17 Claims, 15 Drawing Sheets

U.S. PATENT DOCUMENTS

| | | | |
|---|---|---|---|
| 5,594,806 A * | 1/1997 | Colbert | 382/115 |
| 5,598,515 A * | 1/1997 | Shashua | 345/422 |
| 6,049,621 A * | 4/2000 | Jain et al. | 382/125 |
| 6,094,198 A * | 7/2000 | Shashua | 345/419 |
| 6,243,599 B1 * | 6/2001 | Van Horn | 600/407 |
| 6,301,370 B1 * | 10/2001 | Steffens et al. | 382/103 |
| 6,580,821 B1 * | 6/2003 | Roy | 382/154 |
| 6,621,941 B1 * | 9/2003 | Syeda-Mahmood et al. | 382/306 |
| 6,628,810 B1 * | 9/2003 | Harkin | 382/116 |
| 6,707,933 B1 * | 3/2004 | Mariani et al. | 382/118 |
| 6,711,290 B2 * | 3/2004 | Sparr et al. | 382/186 |
| 7,019,825 B2 * | 3/2006 | Roh et al. | 356/139.03 |
| 7,151,853 B2 * | 12/2006 | Roh et al. | 382/195 |
| 7,245,761 B2 * | 7/2007 | Swaminathan et al. | 382/154 |
| 7,333,631 B2 * | 2/2008 | Roh et al. | 382/104 |
| 7,437,226 B2 * | 10/2008 | Roh et al. | 701/25 |
| 7,505,638 B2 * | 3/2009 | Bober | 382/305 |
| 2002/0012454 A1 * | 1/2002 | Liu et al. | 382/118 |
| 2002/0135618 A1 * | 9/2002 | Maes et al. | 345/767 |
| 2003/0169908 A1 * | 9/2003 | Kim et al. | 382/118 |
| 2004/0012544 A1 * | 1/2004 | Swaminathan et al. | 345/32 |
| 2004/0062419 A1 * | 4/2004 | Roh et al. | 382/104 |
| 2004/0102911 A1 * | 5/2004 | Roh et al. | 702/85 |
| 2004/0151346 A1 * | 8/2004 | Weiss | 382/115 |
| 2005/0228555 A1 * | 10/2005 | Roh et al. | 701/25 |
| 2005/0259882 A1 * | 11/2005 | Dewaele | 382/243 |
| 2005/0286767 A1 * | 12/2005 | Hager et al. | 382/190 |
| 2006/0034517 A1 * | 2/2006 | Bober et al. | 382/190 |
| 2006/0095226 A1 * | 5/2006 | Roh et al. | 702/150 |
| 2007/0036397 A1 * | 2/2007 | Hamza | 382/117 |
| 2007/0201727 A1 * | 8/2007 | Birrell et al. | 382/115 |
| 2007/0274574 A1 * | 11/2007 | Boult et al. | 382/119 |
| 2008/0002860 A1 * | 1/2008 | Super et al. | 382/114 |
| 2008/0177764 A1 * | 7/2008 | Kise et al. | 707/100 |
| 2008/0247677 A1 * | 10/2008 | Yoshino | 382/305 |

OTHER PUBLICATIONS

L. Wong and P. Shi, "Peg-Free Hand Geometry Recognition Using Hierarchical Geometry and Shape Matching", IAPR Workshop on Machine Vision Applications, Nara, Japan, Dec. 2002. pp. 281-284.*

Dapeng Zhang and Wei Shu, "Two novel characteristics in palmprint verification: datum point invariance and line feature matching", Pattern Recognition, vol. 32, Issue 4, Apr. 1999, pp. 691-702.*

Gros, Patrick, "How to use the cross ratio to compute projective invariants from two images", Springer Berlin / Heidelberg, vol. 825/1994, pp. 107-126, Year 1994, ISBN 978-3-540-58240-3.*

Owens, Robyn, "Object recognition", Year 1997, <URL: http://homepages.inf.ed.ac.uk/rbf/CVonline/LOCAL_COPIES/OWENS/LECT13/node5.html>.*

R. Boro, S. Dutta Roy. "Fast and Robust Projective Matching for Fingerprints using Geometric Hashing." In Proc. IAPR-sponsored Indian Conference on Computer Vision, Graphics and Image Processing (ICVGIP), pp. 681-686, 2004.*

* cited by examiner

| Transformations | Euclidean | Similarity | Affine | Projective |
|---|---|---|---|---|
| Rotation | ✓ | ✓ | ✓ | ✓ |
| Translation | ✓ | ✓ | ✓ | ✓ |
| Uniform Scaling |  | ✓ | ✓ | ✓ |
| Non-uniform Scaling |  |  | ✓ | ✓ |
| Shear |  |  | ✓ | ✓ |
| Perspective Projection |  |  |  | ✓ |

FIG. 1

| Invariant Properties | Euclidean | Similarity | Affine | Projective |
|---|---|---|---|---|
| Distance | ✓ |  |  |  |
| Angle | ✓ | ✓ |  |  |
| Ratio of lengths | ✓ | ✓ |  |  |
| Parallelism | ✓ | ✓ | ✓ |  |
| Incidence | ✓ | ✓ | ✓ | ✓ |
| Cross ratio | ✓ | ✓ | ✓ | ✓ |
| Symmetric functions of Cross ratio | ✓ | ✓ | ✓ | ✓ |

FIG. 2

| Picture ID / Distance (x1000) / Picture ID | Person #1 | | Person #2 | | | | Person #3 | | Person #4 | |
|---|---|---|---|---|---|---|---|---|---|---|
| | P1,1 | P1,2 | P2,1 | P2,2 | P2,3 | P2,4 | P3,1 | P3,2 | P4,1 | P4,2 |
| Person #1 P1,1 | 0 | 9.01 | 23.56 | 26.10 | 25.58 | 20.85 | 36.52 | 38.28 | 13.59 | 15.99 |
| Person #1 P1,2 | 9.01 | 0 | 24.42 | 27.45 | 26.04 | 21.26 | 33.10 | 35.18 | 14.05 | 16.44 |
| Person #2 P2,1 | 23.56 | 24.42 | 0 | 7.95 | 7.22 | 9.26 | 25.43 | 27.61 | 15.71 | 13.69 |
| Person #2 P2,2 | 26.10 | 27.45 | 7.95 | 0 | 5.33 | 8.03 | 23.88 | 25.29 | 16.94 | 14.60 |
| Person #2 P2,3 | 25.58 | 26.04 | 7.22 | 5.33 | 0 | 6.09 | 22.85 | 24.57 | 16.50 | 14.19 |
| Person #2 P2,4 | 20.85 | 21.26 | 9.26 | 8.03 | 6.09 | 0 | 22.93 | 24.46 | 12.01 | 10.12 |
| Person #3 P3,1 | 36.52 | 33.10 | 25.43 | 23.88 | 22.85 | 22.93 | 0 | 5.24 | 26.38 | 25.10 |
| Person #3 P3,2 | 38.28 | 35.18 | 27.61 | 25.29 | 24.57 | 24.46 | 5.24 | 0 | 27.86 | 26.48 |
| Person #4 P4,1 | 13.59 | 14.05 | 15.71 | 16.94 | 16.50 | 12.01 | 26.38 | 27.86 | 0 | 3.06 |
| Person #4 P4,2 | 15.99 | 16.44 | 13.69 | 14.60 | 14.19 | 10.12 | 25.10 | 26.48 | 3.06 | 0 |

FIG. 12

| Picture ID \ Picture ID | | Person #5 | | | Person #7 | | Person #9 | | Person #11 | |
|---|---|---|---|---|---|---|---|---|---|---|
| Distance (x1000) | | P5,1 | P5,2 | P5,3 | P7,1 | P7,2 | P9,1 | P9,2 | P11,1 | P11,2 |
| Person #5 | P5,1 | 0 | 8.63 | 6.16 | 30.94 | 32.60 | 19.39 | 20.65 | 21.42 | 23.84 |
| | P5,2 | 8.63 | 0 | 5.02 | 35.14 | 37.35 | 19.93 | 21.26 | 23.13 | 23.89 |
| | P5,3 | 6.16 | 5.02 | 0 | 32.27 | 34.59 | 18.10 | 20.12 | 20.59 | 21.99 |
| Person #7 | P7,1 | 30.94 | 35.14 | 32.27 | 0 | 11.69 | 26.36 | 27.60 | 27.03 | 32.90 |
| | P7,2 | 32.60 | 37.35 | 34.59 | 11.69 | 0 | 27.84 | 28.38 | 29.40 | 35.12 |
| Person #9 | P9,1 | 19.39 | 19.93 | 18.10 | 26.36 | 27.84 | 0 | 4.71 | 15.38 | 17.87 |
| | P9,2 | 20.65 | 21.26 | 20.12 | 27.60 | 28.38 | 4.71 | 0 | 18.05 | 20.24 |
| Person #11 | P11,1 | 21.42 | 23.13 | 20.59 | 27.03 | 29.40 | 15.38 | 18.05 | 0 | 7.65 |
| | P11,2 | 23.84 | 23.89 | 21.99 | 32.90 | 35.12 | 17.87 | 20.24 | 7.65 | 0 |

FIG. 13

| # of dimensions<br>Type of Invariant | 5 | 10 | 18 | 35 | 50 |
|---|---|---|---|---|---|
| $I_1(\tau)$ | 5.016 | 4.140 | 1.837 | 1.946 | 1.286 |
| $I_2(\tau)$ | 7.071 | 6.061 | 3.581 | 3.306 | 2.687 |
| $I_3(\tau)$ | 2.112 | 0.367 | 0.00 | 0.00 | 0.00 |
| $I_4(\tau)$ | 5.958 | 2.531 | 1.836 | 0.603 | 0.422 |
| *Cross Ratio* | 5.418 | 11.086 | 8.861 | 8.673 | 8.265 |

BIOMETRIC SIGNATURES AND IDENTIFICATION THROUGH THE USE OF PROJECTIVE INVARIANTS

RELATED APPLICATIONS

The present invention claims priority on PCT patent application entitled "Biometric Signatures and Identification Through the Use of Projective Invariants", application number PCT/US/2005/029923, filed Aug. 19, 2005 and on provisional patent application, Ser. No. 60/603,304, filed on Aug. 20, 2004, entitled "Biometric Signatures and Identification Through the Use of Projective Invariants" and are hereby incorporated by reference.

STATEMENT REGARDING FEDERALLY SPONSORED RESEARCH OR DEVELOPMENT

The work of the inventors was supported in part by Air Force Research Lab under agreement number F49620-03-1-0207 through Network Information and Space Security Center (NISSC), U. Colorado at Colorado Springs. It was also funded in part by DARPA HID program under contract number N00014-00-1-0929, and by the Colorado Institute for Technology Transfer and Implementation

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention generally relate to biometric signatures and identification. More specifically, embodiments of the present invention describe a system and method for accurate biometric signatures and identification using projective invariant features of a subregion of the human body.

2. Description of the Related Art

Biometrics generally are methods of identifying a person based on a physiological characteristic. Among the features measured are: face, fingerprints, hand geometry, palmprints, iris, retinal, vein, and voice comparison. Biometric technologies are becoming the foundation of an extensive array of highly secure identification and personal verification solutions.

The first modern biometric device, called Identimat, was introduced on a commercial basis in 1976. It measured the shape of the hand and looked particularly at finger length. Shortly thereafter, fingerprint identification systems were widely used in law enforcement. Because of the rapid development of hardware, including computing processors and image capture devices, other biometric-based techniques began to thrive. As the technologies become more stable and trustworthy, biometric identification is expected to substitute the existing personal IDs, e.g. passports.

Fingerprint identification has been utilized as a positive human identifier for over 100 years, and is most widely used application of biometric technologies. However, it suffers from extracting some small unique features from the fingerprints of elderly people as well as manual laborers whose fingerprints are worn out. In addition, since fingerprint identification has been widely employed by law enforcement agencies, it becomes intrusive to individual's privacy. Furthermore, fingerprints acquisition generally require contact further increasing its intrusiveness.

For many applications, other less intrusive techniques that can serve a larger percentage of the population would be preferable. Alternative techniques that identify people based on unique geometric characteristics of subregions of the human body hold promise in addressing these concerns. One area where there has been much research is the hand geometry identification technique. As the name implies, it identifies a person by the geometric structure of hand. Hand geometry identification technique is based on the fact that nearly every person has reasonably different hand shape that does not change after certain age. The shape of hand is composed of certain measurements of the hand such as the length and the width of fingers, the thickness of fingers, the width of palm, the angle of some special points. In existing approaches, the shape of hand is looking at (Euclidean) geometric sizes of various hand features. Various methods are used to measure the size of the hand. These methods are most commonly based either on mechanical or optical principle. The latter ones are much more commonly used today. For instance, optical scanners and digital cameras are typical devices to capture the image of the hand. Constraining the hand allows measurements to be computed from these images and converted to actual sizes.

The biometric community has studied a variety of hand geometry techniques, with varying degrees of success. One approach uses a mirror to allow a side view, various features including widths of the fingers, lengths of the fingers, widths of the palm, as well as heights of the fingers and the palm to be measured. To provide for consistent positions of a hand to be measured, five pegs were used to guide the placement of user's hand on a flat surface of the imaging device.

A major limitation of the prior art is the need for contact, and often the need of pegs. This introduced several problems. First, pegs can deform the shape of the hand. Second, the dependence on alignment means improper placement of a hand can still happen due to the relatively complicated instruction, which can reduce the reliability of the system. Finally, the prior art requires contact, which can be objectionable as it requiring users to place hands where many strangers just put their hands.

Thus, existing biometrics, especially for hand geometry and palm or finger prints, or iris, generally require strongly controlled imaging, usually requiring direct contact or constrained very close proximity to the sensor. In addition, measurements used for the biometric signature described in many previous inventions are Euclidian metrics and hence are distorted under projection and can be effectively used only for identification under nearly identical sensing geometries.

All biometric identification systems seek to find features such the intra-subject variations of the feature measurements are small and do not significantly overlap inter-subject distribution of those features. Features that do not change at all can be called invariant features, e.g. the number of fingers on a subject's hand. More commonly biometric systems consider feature measurements that may vary slightly during measurement but such that over a range of measurement conditions, as constrained by the system design, the measurements vary only slightly. Hence these slightly varying features may be considered quasi-invariant. When considering if a measurement is invariant or quasi-invariant, one must specify what is the range of measurements conditions or transforms under which the invariant property is expected to hold. For example the number of fingers visible on the hand is invariant to general pose variations and movement of the hand, but only if all the fingers are seen. However, while the 3D length of a finger is a general quasi-invariant, the visible "length" of a finger in an image is strongly impacted by the viewing angle of that finger and the pose of that finger. Generally speaking the broader the class of transforms allowed, the fewer invariants that will exist, the less discriminating they will be and the more intra-subject variations can be expected, i.e. the quasi-invariant property holds only over a smaller region of the general transform space. At the other extreme some prior art systems uses "Euclidian invariant", which restrict the sensing system so as preserve Euclidean distance between feature points, e.g. U.S. Pat. No. 5,956,671 teaches an approach to speech recognition that is shift invariant and hence ID Euclidian invariant. If the sensing constraints are not exactly met, then the measurements will vary producing only Euclidian quasi-invariant features. There has been limited work addressing features that are more general than Euclidian invariants but still formal invariants. U.S. Pat. No. 6,178,261 teach an approach to image-based recognition for extracting features that are scale and translation invariant, which is a subset of affine invariant features.

Considerable prior art exists for object recognition through affine invariants, i.e. properties that are invariant to changes in rotation, translation or scale. U.S. Pat. No. 6,362,875 describes a system with scale-invariant and rotation-invariant pattern recognition application that retrieves stored images representative of the object being viewed that includes data representative of a fiducial within the object image. For example U.S. Pat. No. 6,243,493 teaches an approach to a in writing recognition using features that are rotation, translation and scale invariant, i.e. affine invariant features defined as ratio of tangents, and a novel application of the normalized curvature feature. U.S. Pat. No. 6,694,054 introduces a pattern recognition process wherein the pattern characterization step is used to obtain [affine] invariant descriptors of the pattern with a Fourier-Mellin transform. A projective invariant, well known to those skilled in the art, is a property or measurement that is retained when an object is subject to perspective projection. It is stronger than a general invariant, potentially providing improved discrimination, but requires fewer assumptions than an affine or Euclidian invariant. A pure invariant would not change at all, more commonly people consider quasi-invariants where the feature chances very little over a wide range of projective angles.

A key issue when considering projective invariants for biometrics is the actual feature points used to derive the invariant. The features themselves must be stable and be able to be re-identified if true projective invariance is to be computed. A simple example is cross-ratios of feature points—if they cannot be consistently labeled then the cross-ratio cannot be "matched". A subtler example is contour features such as the finger and hand outlines considered in some of the prior art. With just a minor rotation of the finger or hand the actual points on boundary are now either occluded, on the part that turned away, or are completely inside the contour. Thus the features themselves, the points on the occluding contour, are not viewpoint invariant and hence not suitable for use in defining projective invariants. For polygons however, which are the subject of the prior art in invariants, the discontinuity of the surface does make the boundary points stable and hence useful for computing projective invariants. Such features may be useful for defining Euclidean or 2D ridged transform invariant features.

SUMMARY OF THE INVENTION

A method of generating biometric signatures includes the steps of detecting a number of image features of a sub-region of a human. A quasi projective invariant is computed based on a subset of the image features. A number of quasi invariants may be computed based on another subset of the image features. A similarity metric for the quasi projective invariant may be, determined. An image of a hand may be captured in the step of detecting image features. A number of projections of a curved feature may be computed, wherein the quasi projective invariant is obtained as a number of coefficients of a canonical functional representation of at least one the projections. A second group of image features may be captured from a second sub-region of a human. A second quasi invariant may be computed based on a subset of the second f features. The quasi projective invariant and the second quasi invariant may be combined to form a biometric signature.

In one embodiment, a biometric signature system includes a feature capturing system that captures a number of features. A process computing quasi invariants receives the features and computes a quasi projective invariant. A similarity computing process receives the quasi projective invariant and outputs a score. The system may include a biometric signature store coupled to the similarity computing process. The feature capturing system may be an imaging system. The process computing quasi invariants may compute a quasi invariant projective invariant. The process computing quasi invariants may compute a number of quasi invariants to form a biometric signature. The similarity computing process may determine a similarity between a stored quasi projective invariant and the quasi projective invariant. The feature capturing system may capture a first group of features from a first sub-region of a human and capture a second group of features from a second sub-region of the human.

In one embodiment, a biometric signature method includes the steps of capturing a number of features from a human. A projective invariant is calculated from a subset of the features. A similarity is determined between the projective invariant and a stored projective invariant. The human is enrolled to form the stored projective invariant. A number of quasi invariants may be determined from at least a portion of the features to form a biometric signature. A biometric signature may be compared to a stored biometric signature. An image of a hand may be captured as part of capturing a number of features. A number of projections of a curved feature may be computed, wherein the quasi projective invariant is obtained as a number of coefficients of a canonical functional representation of at least one the number of projections.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 1 conceptually illustrates the major Geometry subclasses and the corresponding transformations that represent the changes that the subclass spans.

FIG. 2 conceptually illustrates the major geometry subclasses and invariant properties preserved under each class.

FIG. 12 shows the pair wise comparison of Cross-ratio based projective invariant-based biometric applied 10 pictures of 4 individuals.

FIG. 13 shows the pair wise comparison of Cross-ratio based projective invariant-based biometric applied 10 pictures of different set of 4 individuals.

DETAILED DESCRIPTION

Figure 3:
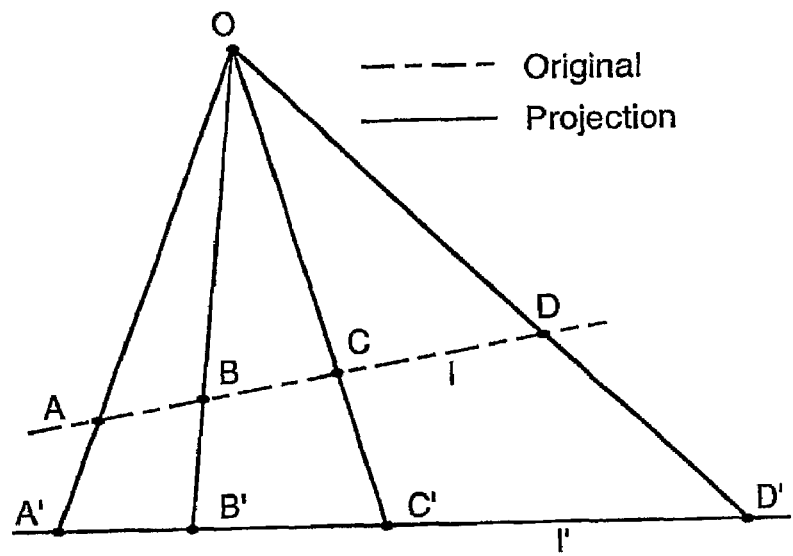
FIG. 3 conceptually shows the projection of four collinear points under an original and an alternative projection, and the corresponding line lengths. Clearly length I is not preserved under projection.

Techniques, systems and methods for obtaining biometric signatures and identification are described. Broadly stated, embodiments of the present invention utilize specified geometric principles to provide means for accurate biometric identification using projective invariant or projective quasi-invariant features of a subregion of the human body.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Certain elements of the embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Certain elements of the embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs); and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, certain elements of the embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention may be described with reference to physical, workstation, network, and domain access, single sign-on, application logon, data protection, remote access to resources, transaction security and Web security, the present invention is equally applicable to various other current and future applications. Additionally, for sake of brevity, embodiments of the present invention are largely described in the context of hand geometry identification. However, it is contemplated that the techniques, systems and methods described herein will have broad applicability to other unique subregions of the human body, including but not limited to irises, eye sockets, teeth, skulls, retinas, ears, and feet.

I. Introduction

"Geometry" generally refers to as the mathematics of the properties, measurement, and relationships of points, lines, angles, surfaces, and solids of an object. In biometrics, geometry identification techniques, as the name implies, identifies persons by the geometric structure of a subregion or series of subregions of the human body. Hand geometry identification technique is based on the fact that nearly every person has reasonably different hand shape which does not change after certain age. Other subregions of the body share similar attributes of difference among individuals and consistency over time. However, for purposes of explanation, much of the discussion is focused on hand geometry, although one skilled in the art will recognize the wide applicability of the principles set forth.

The shape of hand is composed of certain measurements of the hand such as the length and the width of fingers, the thickness of fingers, the width of palm, the angle of some special points. In other words, the shape of hand can be described by looking at some geometric sizes of hand. However, the hand shape by itself might not be able to distinguish people from each other because the features extracted from the hand images might not be sufficient and accurate enough. Though, a variety of other features of a hand such as finger creases and palmprint make hands unique to different person, even for twins. This qualifies the hand a good biological identifier.

In nearly all hand biometric identification systems, feature vectors of a: 3-D hand object are obtained from its picture that is the 2-D representation of it. However, especially in peg-free, touch-free systems, the hand has gained freedom of movement in three dimensions. It can rotate, translate, tilt, or slant. If it moves towards or against the camera, the size of the hand in the picture will even be changed. In order to keep the equivalent substitution of 3-D with 2-D, the three dimension freedoms have to be brought down to two dimensions. Said explicitly, to get a correct match between two pictures of the same hand, the pictures should be taken from the exactly same distance from the hand and exactly same point of view with respect to the hand. However, it is difficult to restrict the moving of a hand without any aid. Thus any motion will change the 2-D appearance of the hand. For instance, slant vertically or tilt horizontally will expose a portion of the hand by its side view. These principles are consistent with image capture for other subregions of the human body.

The distortion of 2-D hand images described above can be interpreted as the result of some projective transformations. There exists a geometry hierarchy. Different combinations of motions such as rotation, translation, scaling, shear, tile, and slant, can construct different levels of geometric transformation, from the lowest level of Euclidean transformation to the highest level of Projective transformation. There are four levels of geometric transformations: Euclidean, Similarity, Affine, and Projective, and each transformation corresponds to one kind of geometry in a geometry hierarchy. Among different geometries, projective geometry has the largest collection of transformations and contains affine geometry that has the subset of similarity geometry. The smallest subset in the hierarchy is Euclidean geometry. The higher levels of subset comprise more transformations, as illustrated in FIG. 1.

When any of the geometric transformations are applied to the object, there are always some features are preserved. These preserved features are so-called geometric invariants. There are different kinds of geometric transformations. Each geometric transformation preserves some features of the object. FIG. 2 shows the invariant features preserved by the corresponding kind of geometric transformation. The number of the invariants decreases while the level of the geometric transformation moves up in the geometry hierarchy. When more geometric transformations are applied to an object, less features of the object will be preserved from changing. Euclidean transformation possesses the most number of invariants because it contains the least number of geometric transformations. On the other hand, projective transformation possesses the least number of invariants while contains most transformations. So when more degrees of freedom for moving are allowed for the object in front of the camera, more possible geometric transformations could be reflected in its 2-D picture. In the peg-free and touch-free biometric identification system, the hand or other subregion of the human body will likely have three degrees of freedom for moving. This implies that the 2-D picture will be experiencing the projective transformation. Consequently, the invariants the picture will possess are incidence and cross ratio.

The general principles of projective invariants describe how one can construct, from a collection of features, metrics that are invariant to projection. Thus, they retain the same value even if the features are subject to a projection such as that which occurs when imaging with a standard camera. Such measurements are not metrics, nor are they a distance measure in an image, rather they are quantities that can be computed and the computed value will remain the same across different projective views. Projective invariants do not satisfy the mathematical definitions of metric or distance measures, though since they themselves are numbers one can define the distance between measurements of the same projective invariant.

According to one embodiment, at least one of the principles of projective invariants described above is used in conjunction with features of the human body that that are invariant (or quasi-invariant) to the projection process inherent in the sensing of the "image," but still variable across individuals and hence contain biometric information. From such combination, accurate biometric signatures and identification procedures are produced. Projective invariants themselves do not satisfy the mathematical definitions of metric or distance measures, and are not directly employed as a biometric. However, since they themselves represented as numbers, if one or more such invariants are combined into a vector one can define a similarity measure between resulting vectors. For use as a projective invariant biometric, it is not sufficient that resulting properties are invariant. Instead, they need to also discriminate between different classes of interest, e.g. if a feature is defined as "the number of fingers on the hand," it is a projective invariant but not very discriminatory, and hence of little use as a projective invariant biometric.

According to different embodiments of the invention, image features may detected from the palm-side of a hand, the back-side of a hand, a fingerprint, a palmprint, a face, an ear, an eye-region, an iris, a retina, the teeth or jaw features, or any other subregion of the human body.

According to one embodiment, the feature points used to derive the invariant are restricted to approximately planar objects. The analysis is less complex if so restricted, as the mapping from scene points to image points is one to one. Most of the examples presented will be for planar subparts of objects. According to one embodiment, the feature points used to derive the invariant are not restricted to such planar objects. The full 3D case is of greater complexity, as no 3D invariant can be extracted from a single perspective image of a set of general 3D points, unless something further is known about the point configuration (for instance, that some of them are coplanar as is generally the case for points along the eye sockets even though the overall face has complex 3D structure. By using ordering constraints, points of inflections, or co-planarity, those skilled in the art of invariants can often find projective invariants (or quasi-invariants) for the specialized 3D curves or points that result. For general 3D curves, the more useful form of projective invariants use multiple images. Given the discussion in this document, those skilled in the art will be able to directly apply the results of multi-view 3D projective invariants to derive projective invariant biometrics.

An important issue when considering projective invariants for biometrics is the actual feature points used to derive the invariant. The features are to be invariant (or quasi-invariant) to the projection process inherent in the sensing of the image, but shall still vary across individuals and hence contain biometric information. The features themselves must be stable and be able to be re-identified if true projective invariance is to be computed. A simple example is cross-ratios of feature points—if they cannot be consistently labeled then the cross-ratio cannot be "matched". A subtler example is contour features such as the finger and hand outlines considered in the prior art. With just a minor rotation of the finger or hand, the actual points on boundary become either occluded, on the part that turned away, or are completely inside the contour. Thus the feature itself, the occluding points, is not viewpoint invariant (except for discontinuous edges as in polygons), and hence not suitable for use in defining projective invariants.

According to one embodiment, the invention supports multi-modal integration of both projective invariant features and traditional non-projective features which can often be computed from the same image, e.g. a outstretched hand an face contained in the same image. That a single sensor image can be useful for multi-biometric is an important enhancement that can reduce overall system costs

II. Cross Ratios

Projective geometry does not preserve Euclidean distances, angles or ratios of distances/angles. According to one embodiment of the invention, it is necessary to identify features that are projective invariant, yet discriminate individuals. The cross ratio, which is the ratio of ratios of some particular properties, is invariant to the projective distortion. There are a lot of other projective invariants, but the cross ratio is relatively straightforward, and is often considered to be the classic invariant.

According to one embodiment of the invention, a one-dimensional cross ratio is used. As is know to those skilled in the art, the one-dimensional cross ratio $\tau$, is defined in terms of the distances between four collinear points. As shown in FIG. 3, let four collinear points A, B, C, and D on line l. Points A', B', C', and D' are their projections on line l'. Then, the 1-D cross ratio can be defined as follows:

$$\tau = \frac{\|AC\| \cdot \|BD\|}{\|AD\| \cdot \|BC\|} = \frac{\|A'C'\| \cdot \|B'D'\|}{\|A'D'\| \cdot \|B'C'\|}$$

where $\|\Box\|$ denotes the Euclidean distances between two points. This equation is very important because describes the intrinsic essential characteristics of any object under projective transformations, so that these characteristics can be used as the invariant signature of object. This actually models part of the visual capability of human beings, which is used to distinguish or identify objects.

According to one embodiment, the features captured are the projections of at least 4 points from collinear subregion of a human body and the project invariant values are 1D cross-ratios computed from the locations of subsets of at least 4 of these feature points. The general assumption for the use of the 1D cross ratios as a (quasi) projective invariant is that the underlying feature is 4 points that are (approximately) co-linear. Examples would be joint spacings on a finger, teeth spacings on dental x-rays, spacing of zero-crossings of temporal signal. If more than 4 co-linear points exist, it is important that the features be such that the identification of the first point (say A above) is possible, e.g., the point closest to the tip of the finger or the back of the mouth.

Figure 4:
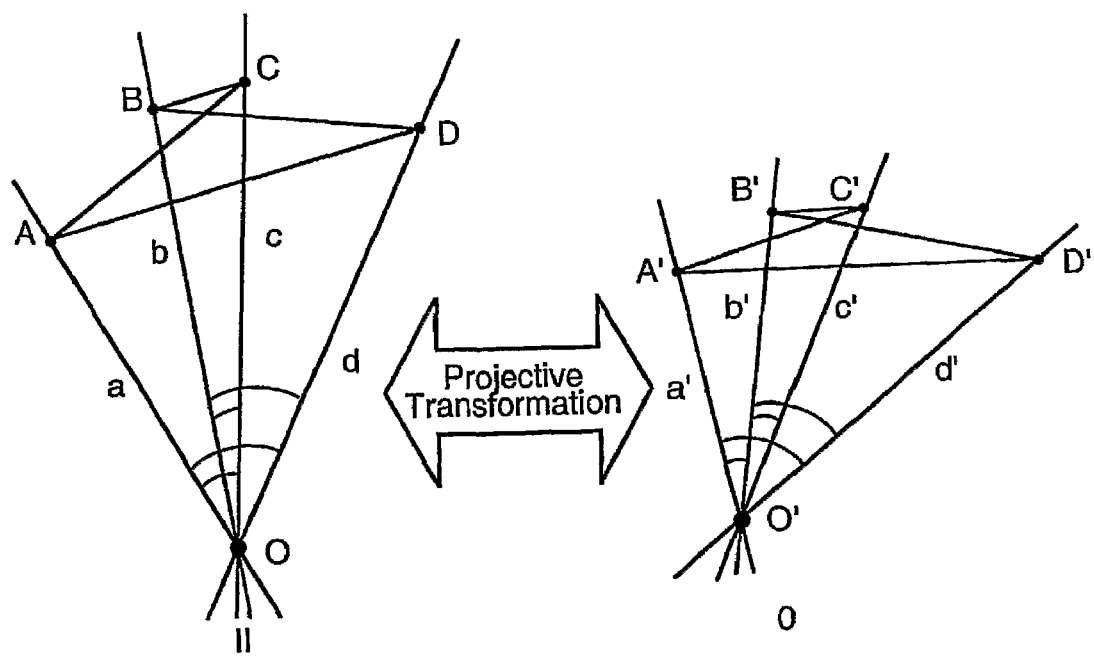
FIG. 4 illustrates the projection of four coplanar lines that have one point in common. Again line lengths are not preserved, nor are angles.

According to one embodiment of the invention, a two-dimensional cross ratio is used. Under projective transformations neither area of planar object nor angle established by two intersecting lines is preserved. However, the cross ratios created by five coplanar points or four coplanar concurrent lines are invariant. FIG. 4 shows a pencil of four concurrent lines, a, b, c, and d, in the same projective plane $\pi$. By projective transformation T, they are transformed into a', b', c', and d', respectively, in projective plane $\Pi$. On plane $\pi$, points A, B, C, and D are on the lines a, b, c, and d, respectively. Point O is the intersecting point of lines a, b, c, and d. No three of these five points, including O, should be collinear. On the other hand, on the transformed plane $\Pi$, A', B', C', and D' are points on the lines a', b', c', and d', respectively. Likewise, O' is the intersecting point of the lines. Since points set A', B', C', D', and O' are the projections of points A, B, C, D, and O, the 2-D cross ratios of two five-point sets in FIG. 4 can be computed by the following equation $$\tau = \frac{\sin(\angle AOC)}{\sin(\angle AOD)} \cdot \frac{\sin(\angle BOD)}{\sin(\angle BOC)} = \frac{\sin(\angle A'O'C')}{\sin(\angle A'O'D')} \cdot \frac{\sin(\angle B'O'D')}{\sin(\angle B'O'C')}$$

where $\angle \cdot$ denotes the angle created by three points. This type feature assumes points where the reference point (O) is distinguishable, and the points ABCD can be labeled. There are processes that may be used to symmetrize the cross-rations, but the problem is that when one symmetrizes the invariants discriminating power is reduced.

According to one embodiment, features captured are the projections of at least 6 points from co-planar subregion of a human body and the project invariant values are 2D cross-ratios computed from the 2D locations of subsets of at least 5 of these feature points. Generally, when comparing 2D cross ratios, it is very important to recall that they are highly non-linear and simple similarity measures between vectors of them (e.g. using Euclidean distance) are less discriminative. According to one embodiment, a Mahalanobis distance is used. Those skilled in the art will recognize that the different 2D configurations can processed differently based on the underlying typology of the convex hull of the 5 points. This can improve the comparison and may be incorporated within the invention without great difficulty.

The next forms of projective invariants are those defined by a larger collection of points, or a set of distinguished points and the points on a curve. According to one embodiment, this form of projective invariant is used. One such an invariant is the projective curvature that characterizes all curves up to a projective transformation. However, the projective curvature depends on higher (at least seventh) order derivatives, so is very sensitive to noise. For simple curves, e.g. the principle curves of a palm or the shape of eyes, less complex approaches may be applied. In fact by some auxiliary points, the curves of interest may be transferred into a so called canonical system in which all projectively equivalent curves will be mapped to the same shape.

Figure 5:
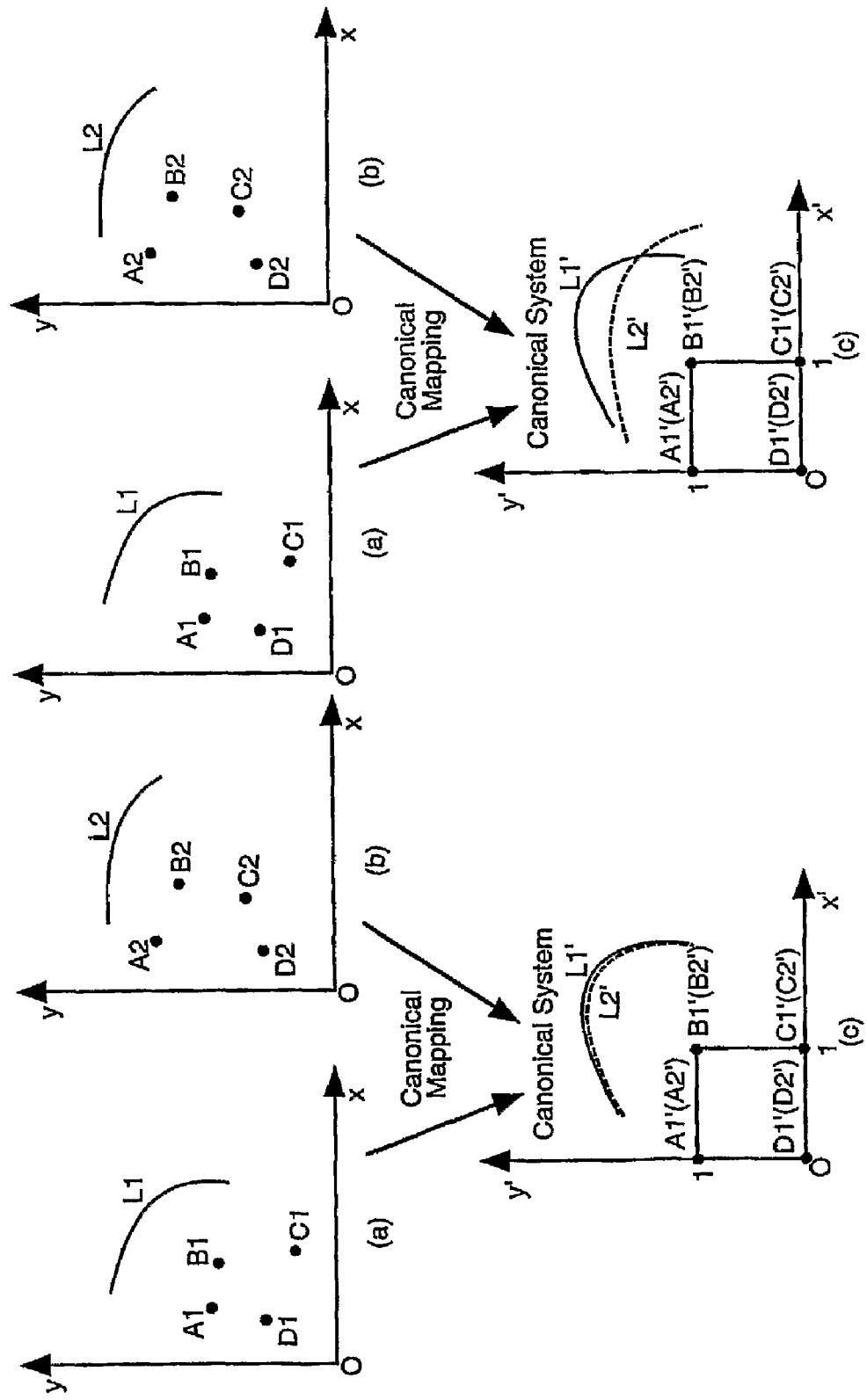
FIG. 5 illustrates projective invariants of curves using a canonical coordinate system. The 4 labeled points define the canonical coordinate system that is used to transform data from different projections. After two curves L1 and L2 closely match in the canonical system on the left, suggesting they are from the same feature, but they do not match using the transform on the right, indicating they are not from the same source.

A canonical system for a curve may be defined as a coordinate system in which all the projective representations of a curve map to the unique shape. Essentially, a 2-D canonical system is a special projective plane. Other planes can be mapped onto this plane by any projective transformations. Those skilled in the art will recall that a projective transformation matrix can be determined by the correspondences of four coplanar points in different projective planes. So by mapping 4 reference points, the different shapes in other projective planes can be assumed to be the same shape in this canonical system. The correspondence created by this assumption can then be used to find the projective transformation matrix. As an example, assume that all quadrilaterals will be mapped to a unity square in the canonical system. FIG. 5 gives an example. The eight linear equations created by this four-point correspondence can uniquely determine a projective transformation. Then other points that are on the same plane with the quadrilateral may be used as projective invariants of the object of consideration.

The resulting "curve matching" in the canonical reference space may use a robust similarity measure such as the Hausdorff distance, since its possible the ends of the curve will not have been equally well detected in both images. Some examples of biometric features where this type of projective invariant would be useful include features such as palm creases with distinguished features on the fingers, curves on the ear with distinguished high-curvature points within the ear, features on the eyes with junctions as feature points, and jaw-bone lines with individual teeth as reference points (in dental x-rays).

A more general form of projective invariants of curve features does not require feature points but does require higher order representations of the curve so that it must be sufficiently smooth. According to one embodiment, this form of projective invariant is used. Weiss presents an algorithm that transforms a planar curve into a canonical system without knowing the correspondence of four points [Weiss-95], which is incorporated herein by reference. This algorithm can handle the invariants of more complicated curves, is resistant to partial occlusion, and does use a nodal cubic curve function along the curve. The mathematics are considerably more complex so we don't provide an example here, but those skilled in the art will be able to understand from the discussion herein how they can be applied for biometrics. This general form can be applied to many biometrically interesting curved features, if they are sufficiently smooth. All of the examples above for points and curves apply here, presuming there is sufficient resolution to fit the curve well. The tradeoff is that the implicit normalization required in developing the higher-order algebraic forms will reduce the discriminatory power of the resulting metric.

III. Capture

According to one embodiment of the present invention, an imaging device is used to capture a number of features of at least part of one subregion of the human body. Such a device may be an analog or digital camera, an optical or other scanner, an imaging radar, a thermal imaging device, an ultrasound, a radar device, an electro-capacitive measurement device, or any other form of imaging device or feature detector used to capture or otherwise collect information, features, or images. The capture process may include a temporal component. Thus a measurement device that projects away time or a mixture of space and time to form a static array of measurements would also be included, allowing it to be potentially applied to dynamic signature, EEG, EKG, or voice measurements.

According to one embodiment, capture is "touch-free." The information, features, or images are thus captured without contact of any guide, peg, platform, or other device to provide image stabilization to the subregion at issue or any other part of the human body. There is no requirement for direct contact or constrained very close proximity to the sensor.

The term "image" is used throughout in a very general sense. According to one embodiment, it is used to mean the one or more dimensional vector of measurements that occur when the real-world process or subregion of the human body is subjected to a measurement apparatus that reduces the dimensionality in generating the signal.

The components and subcomponents of (1) capture, (2) projection, (3) computation of the projective invariant features, and (4) matching against other biometrics may be done on different devices and in different locations.

IV. Hand Identification by Projective Invariants

Figure 6:
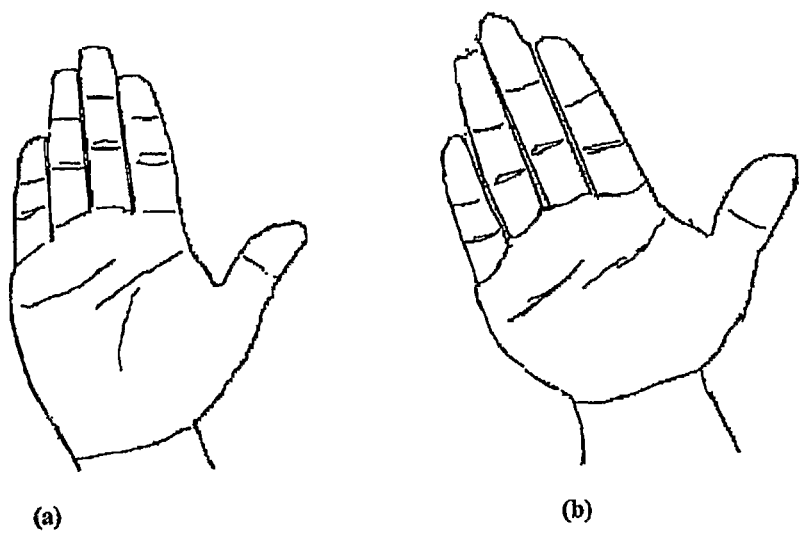
FIG. 6 illustrates the same hand seen from different viewpoints. The view on the left (a) is approximately frontal while the one on the right (b) is tilted with fingers toward the viewer and thumb slightly upward.

According to one embodiment, a digital camera is used as the imaging device to capture a hand for purposes of identification and the creation of a biometric signature. The user is directed to join their fingers as closely as possible when taking the hand pictures and keep their hand stretched flat. The result is only approximately planar and thus the cross rations are only quasi-invariant. But for reasonable imaging distance the variations from planarity with respect to viewing variations are very minor, much less than the error localization of the feature points. Users have the flexibility to pose their hands as they like, as long as major part of the hand plane is exposed to the camera. Therefore, the pictures of this hand plane taken from different viewpoints can be regarded as the projections of the original hand plane onto arbitrary projective planes. FIG. 6 shows two examples of such pictures.

Figure 7:
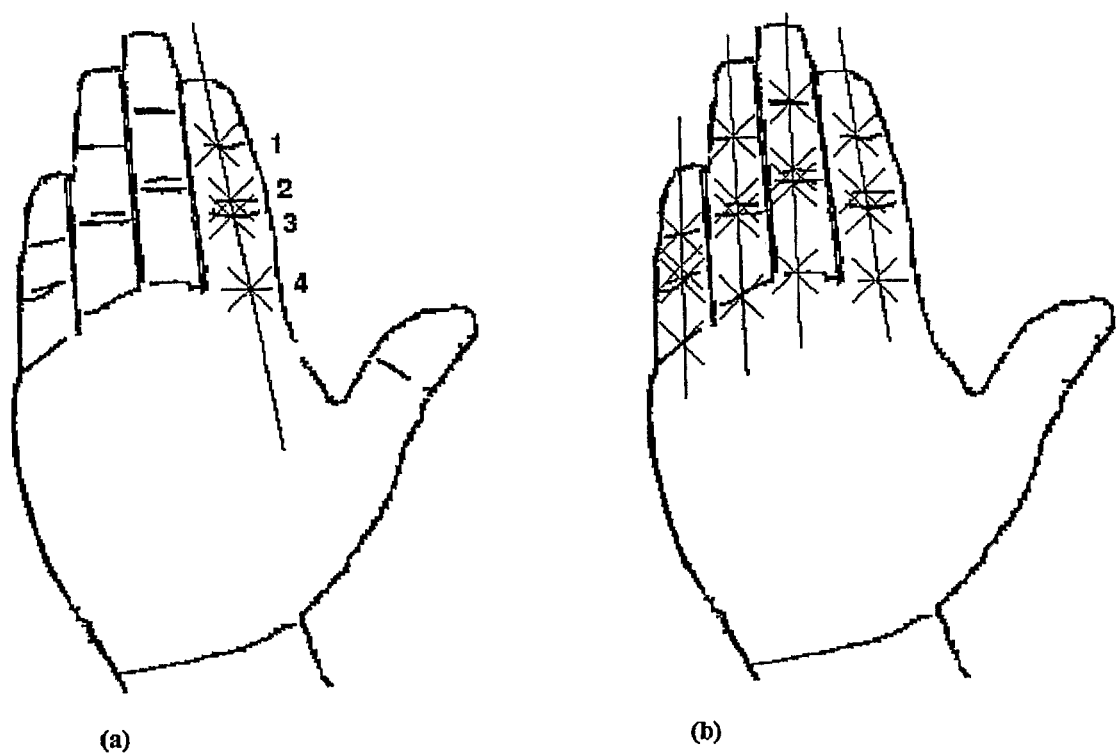
FIG. 7 illustrates feature points on the fingers (drawn as a large X). The left (a) shows four feature points suitable for ID cross rations. The right (b) shows 16 features suitable for use with 2D cross-ratios.
Figure 8:
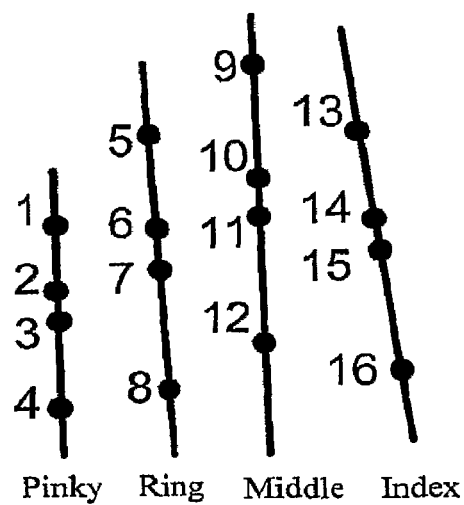
FIG. 8 illustrates the layout of collinear features points for 1-D cross ratios

According to one embodiment, to acquire the 1-D cross ratios from a hand, at least four collinear points are extracted. There are a number of four-point or more sets existing on the hand plane. One can always find a straight line going through a finger. This line shall be identified as a middle line of a finger. Such a line can be located by connecting the middle points of finger widths. According to one embodiment, the intersecting points of this line and the crease lines on the finger give the collinear points. This is shown in FIG. 7(a). In this embodiment, four points are extracted from each finger except the thumb. The four fingers give 16 feature points in total. This is shown in FIG. 7(b). The four points from top to bottom on the pinky finger are denoted as 1~4, and those on the ring finger 5~8, those on the middle finger 9~12, and those on the index finger 13~16. Generating the four feature points on each finger qualifies them for computing the 1-D cross ratios. Thus there are four 1-D cross ratios, one from each finger, as shown in FIG. 8 with the advantage that these features are invariant to individual finger movement. According to one embodiment, other feature points may be used. Care should be exercised in the choice to insure the feature is computable and invariant. For example, the finger tips, while easily found, are not even quasi-invariant with view because as the hand tilts down the point of occlusion moves quickly over the tip of the finger. If the resolution of the image is moderately reduced the two independent curves for middle joint, e.g. 2 and 3, will coalesce into a single feature providing 12 feature points on the hand.

According to one embodiment, the features captured are the projections of at least 4 points from collinear subregion of palm-side or back-side of a hand and the project invariant values are 1D cross-ratios computed from the locations of subsets of at least 4 of these feature points.

Figure 9:
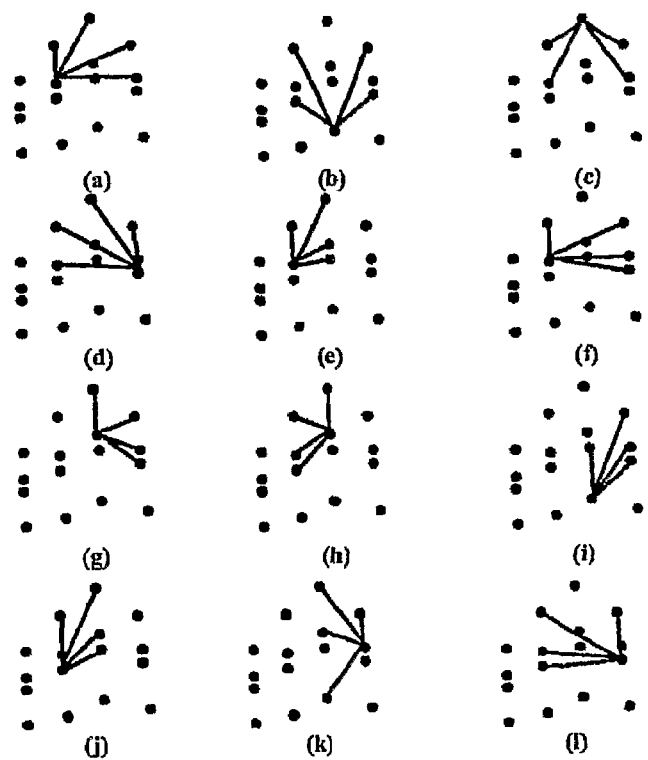
FIG. 9 illustrates twelve five-point layouts for 2-D cross ratios. Out of the thousands possible these 12 were selected to reduce increase stability by reducing nearly degenerate situations.
Figure 10:
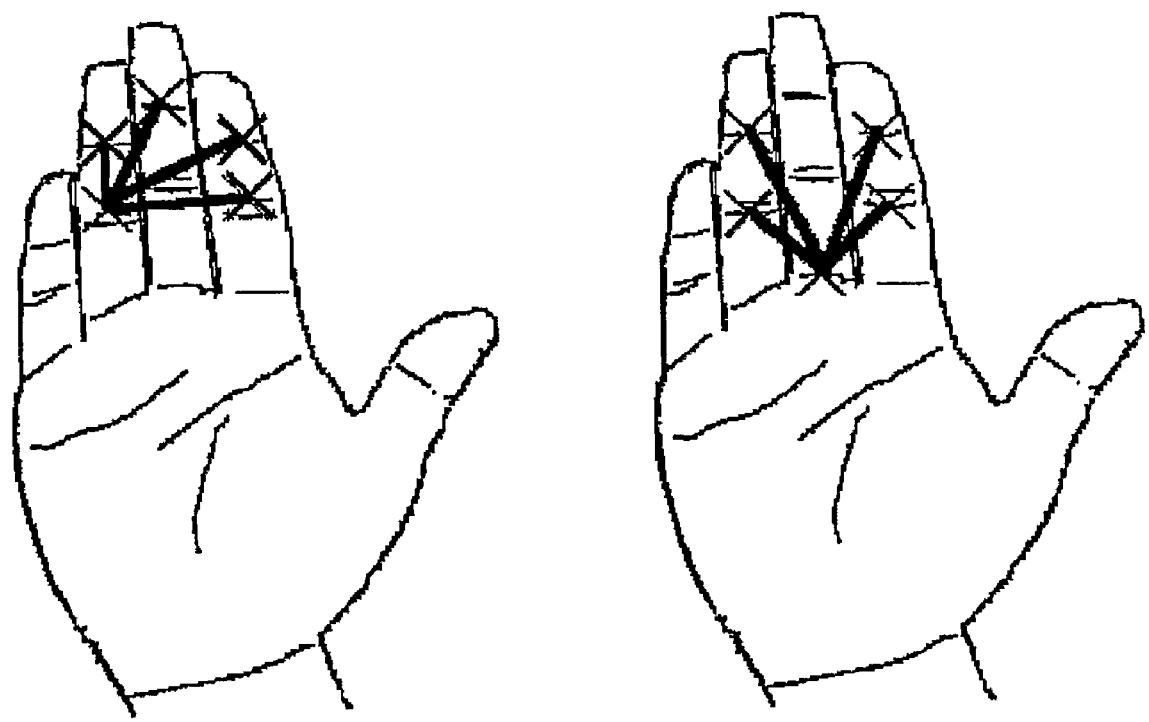
FIG. 10 illustrates two different qualified five-point sets superimposed on a drawing of the hand.

According to one embodiment, 2-D cross ratios are used as well since the object is a 2-D hand plane. Thus, the size of the feature vector will be increased, and the robustness of the technology will be improved. According to one embodiment, the 2-D cross ratio is computed based on two assumptions. The first is a coplanar five-point set, and the second is that no three points which include the reference point O should be collinear. The same 16 feature points noted above will be used again, and subsets will be identified satisfying the requirements. The first assumption is automatically satisfied because all the feature points are extracted from the hand plane. There are plenty of qualified five-point sets within the 4096 possible combinations of 16 points. Twelve example five-point layouts were selected, as shown in FIG. 9. One 2-D cross ratio was obtained from each layout. In FIG. 8, each five-point layout is corresponding to the five points O, A, B, C, and D. The points used in each layout are: (a) 6, 5, 9, 13, 14; (b) 12, 7, 5, 13, 15; (c) 9, 13, 14, 6, 5; (d) 15, 6, 5, 9, 13; (e) 10, 9, 13, 14, 15; (f) 6, 5, 13, 14, 15; (g) 9, 13, 10, 6, 5; (h) 10, 7, 6, 5, 9; (i) 12, 11, 13, 14, 15; (j) 7, 5, 9, 10, 11; (k) 14, 12, 10, 9, 13; (l) 15, 7, 6, 5, 13. FIG. 10 illustrates a qualified five-point set on the hand plane.

According to one embodiment, features captured are the projections of at least 6 points from co-planar subregion of a palm-side or back-side of a hand and the project invariant values are 2D cross-ratios computed from the 2D locations of subsets of at least 5 of these feature points.

However, as is know to those skilled in the art, cross ratios can be sensitive to positional errors, and it has been demonstrated that several pixels offset of the feature points can cause drastic changes in the cross ratio values. Positional errors are inevitable when the feature points are detected. So alternative projective invariant hand features that have stronger noise immunity may be employed. Ratios of symmetric polynomials of cross ratios derived from a five-point set are projective and permutation invariants (PPI), which means the value of a PPI feature is preserved under the projective transformations applied to the five-point set, and also independent of the permutation of the five points. However, different ordering of the five points results in different 2D cross ratio values. By fixing one of the five points as the intersection point, different cross ratios can be categorized into five groups. Each group corresponds to one intersection point and has the permutation of the remaining 4 points. The 4!=24 permutations in each group yield only six different cross ratios:

$$\tau_1 = \tau, \tau_2 = \frac{1}{\tau}, \tau_3 = \frac{\tau-1}{\tau}, \tau_4 = \frac{\tau}{\tau-1}, \tau_5 = \frac{1}{1-\tau}, \tau_6 = 1-\tau,$$

where $\tau$ is a 2D cross ratio produced by a particular five-point layout. The permutation invariant property of these six cross ratios can be expressed as:

$$\begin{pmatrix} \tau_1, \tau_2, \tau_3, \\ \tau_4, \tau_5, \tau_6 \end{pmatrix}_{\{O,\Pi(A,B,C,D)\}} = \Pi(\tau_1, \tau_2, \tau_3, \tau_4, \tau_5, \tau_6)_{\{O,A,B,C,D\}}$$

where $\Pi(\cdot)$ denotes a permutation operation, and $\{O, A, B, C, D\}$ are the five points determining $\tau_i$, i=1, 2, . . . , 6, with point O being the intersection point. Six different cross ratios are resulted from the permutation of the remaining non intersection points A, B, C, D, A function that includes all six different 2D cross ratios $\tau_i$(i=1, 2, . . . , 6) with equal contribution has the advantage that that the function will have the same value under all possible permutations.

A symmetric polynomial of n variables $x_1, x_2, \ldots, x_n$, denoted as $P(x_1, x_2, \ldots, x_n)$ remains the same value independent of any permutation of its variables and satisfies the following equation:

$$P(x_1, x_2, \ldots, x_n) = P(\Pi(x_1, x_2, \ldots, x_n))$$

As described by Equation (5-3), a five-point set with one point fixed as the intersection point always generates six cross ratio values, while the permutation of the remaining four points will only change the order in which the cross ratios appear. So a symmetric polynomial using the six cross ratios $\tau_i$(i=1, 2, . . . , 6) as arguments is invariant to the permutation of the points. Thus, we have $$P\left(\begin{pmatrix} \tau_1, \tau_2, \tau_3, \\ \tau_4, \tau_5, \tau_6 \end{pmatrix}_{\{O,\Pi(A,B,C,D)\}}\right) = P(\Pi(\tau_1, \tau_2, \tau_3, \tau_4, \tau_5, \tau_6)_{\{O,A,B,C,D\}})$$

$$= P((\tau_1, \tau_2, \tau_3, \tau_4, \tau_5, \tau_6)_{\{O,A,B,C,D\}})$$

It is known that any function $f$ having the symmetric polynomials as arguments is also invariant to the permutation {O, Π(A, B, C, D)}. If we denote the original point set {O, A, B, C, D} as S, and the point set from the permutation {O, Π(A, B, C, D)} as S', then the permutation invariant property of function $f$ can be expressed as:

$$f(P_1(\tau_{S'}), P_2(\tau_{S'}), \ldots, P_n(\tau_{S'})) = f(P_1(\tau_S), P_2(\tau_S), \ldots, P_n(\tau_S))$$

Since the actual variable of the function $f(P_1(\tau_S), P_2(\tau_S), \ldots, P_n(\tau_S))$ is the projective invariant $\tau_S$, $f(P_1(\tau_S), P_2(\tau_S), \ldots, P_n(\tau_S))$ itself is also a projective permutation invariant (PPI). The elementary symmetric polynomials include:

$$P_1(x_1, x_2, \ldots, x_n) = \sum_{i=1}^{n} x_i,$$

$$P_2(x_1, x_2, \ldots, x_n) = \sum_{1 \le i_1 \le i_2 \le n} x_{i_1} x_{i_2},$$

...

$$P_m(x_1, x_2, \ldots, x_n) = \sum_{1 \le i_1 \le \cdots \le i_m \le n} x_{i_1} \ldots x_{i_m},$$

...

$$P_n(x_1, x_2, \ldots, x_n) = \prod_{i=1}^{n} x_i$$

The polynomial $P_m(x_1, x_2, \ldots, x_n)$ is called the m-th symmetric polynomial of $x_1, \ldots, x_n$. Embodiments can use any of these as the basis for the PPI, and testing has been done using the first, the second, the third symmetric polynomials, and the second order power sum symmetric polynomial:

$$P_1(\tau) = \sum_{i=1}^{6} \tau_i = 3,$$

$$P_2(\tau) = \sum_{1 \le i \le j \le 6} \tau_i \tau_j = \frac{-\tau^6 + 3\tau^5 - 5\tau^3 + 3\tau - 1}{\tau^2(\tau-1)^2},$$

$$P_3(\tau) = \sum_{1 \le i \le j \le k \le 6} \tau_i \tau_j \tau_k = \frac{-2\tau^6 + 6\tau^5 - 5\tau^4 - 5\tau^2 + 6\tau - 2}{\tau^2(\tau-1)^2},$$

$$\tilde{P}(\tau) = \sum_{i=1}^{6} \tau_i^2 = \frac{2\tau^6 - 6\tau^5 + 9\tau^4 - 8\tau^3 + 9\tau^2 - 6\tau + 2}{\tau^2(\tau-1)^2}$$

Polynomials $P_2(\tau)$, $P_3(\tau)$, and $\tilde{P}(\tau)$ are unbounded functions with nontrivial values. But the ratios of the polynomials are bounded. The ratio of the symmetric polynomials or the ratios of combinations of symmetric polynomials are also valid PPIs. The PPI ratios of the symmetric polynomials considered in this research include:

$$I_1(\tau) = \frac{P_1(\tau)\tilde{P}(\tau)}{\tilde{P}(\tau) - P_2(\tau)} = \frac{2\tau^6 - 6\tau^5 + 9\tau^4 - 8\tau^3 + 9\tau^2 - 6\tau + 2}{\tau^6 - 3\tau^5 + 3\tau^4 - \tau^3 + 3\tau^2 - 3\tau + 1},$$

$$I_2(\tau) = \frac{P_3(\tau)}{P_2(\tau)} = \frac{-2\tau^6 + 6\tau^5 - 5\tau^4 - 5\tau^2 + 6\tau - 2}{-\tau^6 + 3\tau^5 - 5\tau^3 + 3\tau - 1},$$

$$I_3(\tau) = \left(\frac{\tilde{P}(\tau)}{-P_2(\tau)}\right)^3 = \left(\frac{2\tau^6 - 6\tau^5 + 9\tau^4 - 8\tau^3 + 9\tau^2 - 6\tau + 2}{-(\tau^6 - 3\tau^5 - 5\tau^3 + 3\tau - 1)}\right)^3,$$

$$I_4(\tau) = \exp\left(\frac{P_3(\tau)}{P_2(\tau)}\right) = \exp\left(\frac{-2\tau^6 + 6\tau^5 - 5\tau^4 - 5\tau^2 + 6\tau - 2}{-\tau^6 + 3\tau^5 - 5\tau^3 + 3\tau - 1}\right)$$

Figure 11:
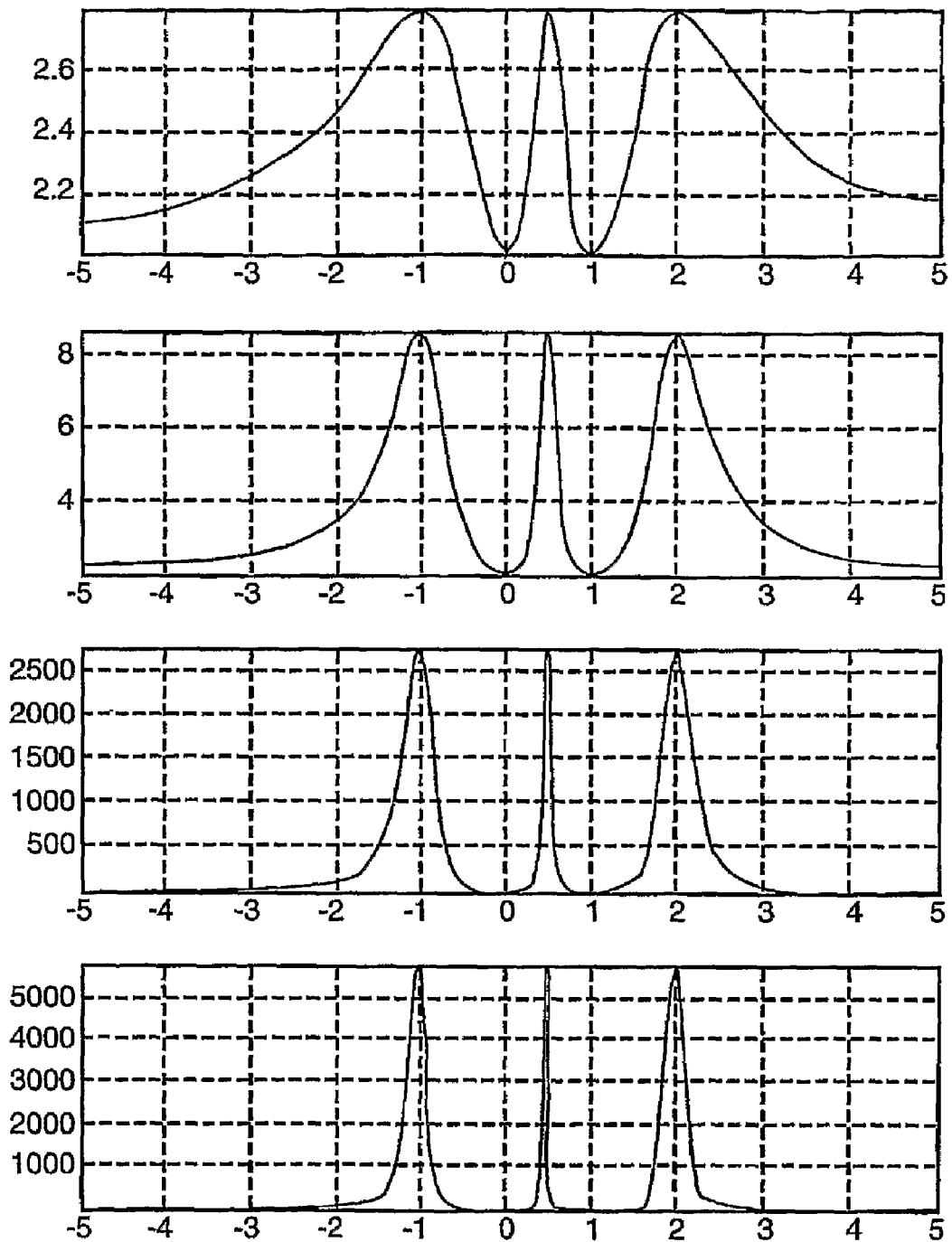
FIG. 11 shows Response curves of four different Permutation and Projective Invariant functions over a range of inputs.
Figures 14, 15:
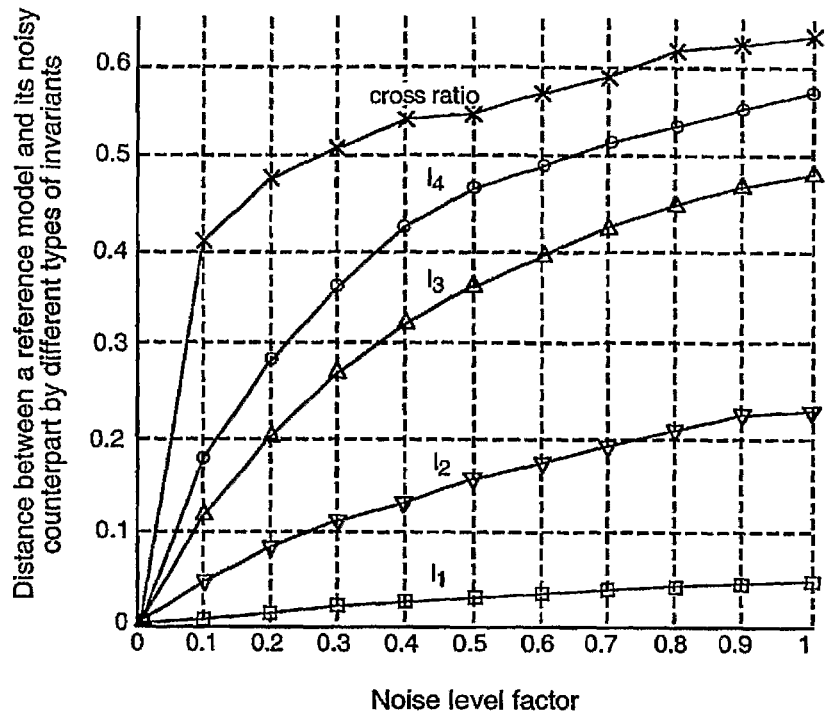
FIG. 14 shows the effects of the positional noise on hand feature vectors composed of $I1(\tau)$, $I2(\tau)$, $I3(\tau)$, $I4(\tau)$, and cross ratios, measured by the distance between a genuine model and its (simulated) noisy counterparts.
FIG. 15 shows a table of performance (Equal Error Rate as a %) of embodiments with different types of invariant and various lengths of hand feature vectors

$I_1(\tau)$ is bounded between 2 and 2.8 as was shown by Meer et al [Meer-et-al-98], which is incorporated herein by reference. The PPIs $I_2(\tau)$, $I_3(\tau)$ and $I_4(\tau)$ were developed by the inventors for use in projective invariant biometrics. $I_2(\tau)$ is bounded between 2 and 8.7, $I_3(\tau)$ is bounded between 8 to 2744, and $I_4(\tau)$ is bounded between 7.4 and 5806. FIG. 11 shows the response properties of these four PPIs.

Different embodiments can optimize tradeoffs between discriminatory power, computational cost and robustness to occlusion. From one 2-D cross ratio, potentially thousands of layouts can be obtained. Since they are easily distinguished, a multi-dimensional projective invariant biometric signature may be built which can handle missing features or even missing fingers. According to one embodiment, effective similarity measures incorporating Manhalanobis distance measures for each different topology are used.

Feature Vector Computation: According to one embodiment, the hand descriptor is represented by a feature vector which is composed of both 1-D and 2-D cross ratios which may also be combined into PPIs. In testing one embodiment, the feature vector V has a size of sixteen since sixteen cross ratios were computed.

$$V = \{\Psi_1, \Psi_2, \ldots \Psi_N\}, N=16$$

where $\Psi_i$ represents the 2-D cross ratios when i=1~12; $\Psi_i$ represents the 1-D cross ratios when i=13~16. The distance, D, between two feature vectors of two hand images is calculated using the following equation:

$$D = \frac{1}{N}\sqrt{\sum_{i=1}^{N}\left(\frac{\Psi_i^j - \Psi_i^k}{\mu_i}\right)^2}, N=16$$

where $\Psi_i^j$ and $\Psi_i^k$ are the ith cross ratios of the feature vectors of hand j and hand k, and $$\mu = \frac{\Psi_i^j + \Psi_i^k}{2}$$

Testing the cross-ratio based embodiment, a total of 31 hand pictures were collected from 14 persons. Each person was given an ID number, from 1 to 14, respectively. The pictures were also indexed. In the tables in FIGS. 12-15, Pi,j represents the $j^{th}$ picture of Person # i. 465 different pairs were tested, one against another, with fairly promising results.

FIGS. 12-15 show part of the experimental results. The entries indicate the distances, scaled by 1000, between the feature vectors of two hand images.

The tables in FIGS. 12-15 show that the pictures from the same person have small distance, and conversely, the pictures from different persons have large distances. Different tests were done based on various thresholds. When the threshold drops down to 0.007, FAR becomes zero; at the same time, FRR equals 2.8%. The Equal Error Rate (ERR) happens when the threshold is set around 0.012.

Figure 16:
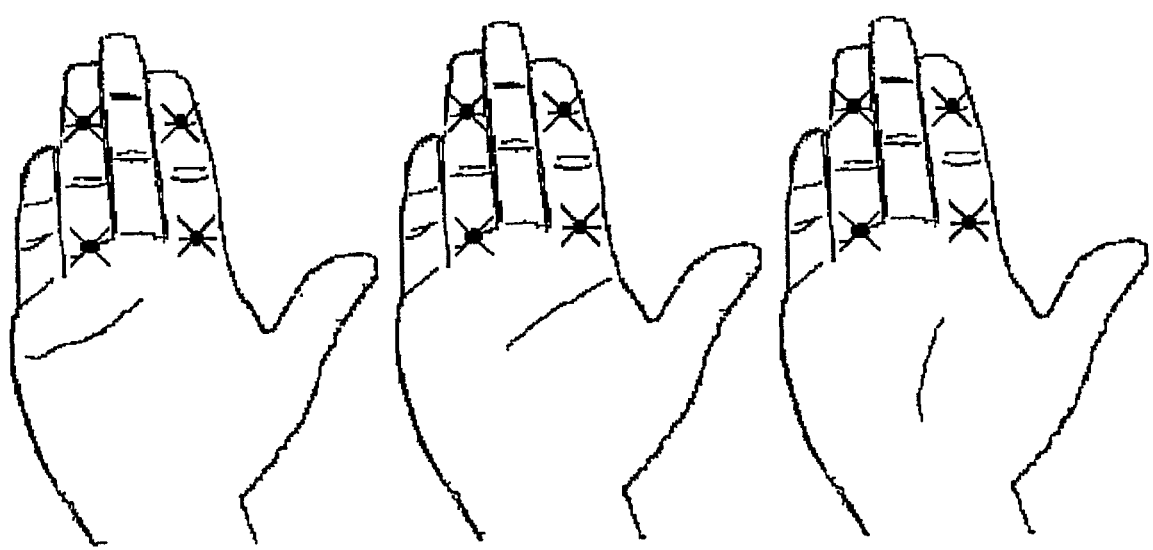
FIG. 16 illustrates feature points for a canonical coordinate system basis and three different curves in the hand plane that could be used for biometric signatures.

Testing for other embodiments used a variation of the feature vector normalization given by $\tilde{d}$:

$$\tilde{d} = \sqrt{\frac{\sum_{i=1}^{N}\left(inv_i^{\psi_1} - inv_i^{\psi_2}\right)^2}{2(\|\psi_1\|_2^2 + \|\psi_2\|_2^2)}}$$

where $\psi 1$ and $\psi 2$ are two hand feature vectors, N is the dimension of the vectors, and $inv_i^{\psi_1}$ represents the ith component in the feature vector $\psi 1$. This similarity metric normalizes by the square of the vector and is may be more appropriate for some types of feature localization error. This was used to test the PPIs and compare their performance with the cross ratios, using hand data with 5000 random synthetic variations in feature location. FIG. 16 shows the effects of the positional noise on hand feature vectors composed of I1($\tau$), I2($\tau$), I3($\tau$), I4($\tau$), and cross ratios, measured by the distance between a genuine model and its noisy counterpart As already described, features for projective invariants do not need to be point or even point sets. Curves can also be used and FIG. 16 shows three different curves in the palm of a hand and the 4 points uses to define the canonical coordinate system for remapping those curves. Of course any subset of 4 points could be used, though they would have differing stability in detection and in remapping. While example shows "discrete curves", those skilled in the art will recognize they could use a functional form fit to the discrete curve, and also directly manipulate the resulting functional representation to allow for more efficient comparison.

Figure 17:
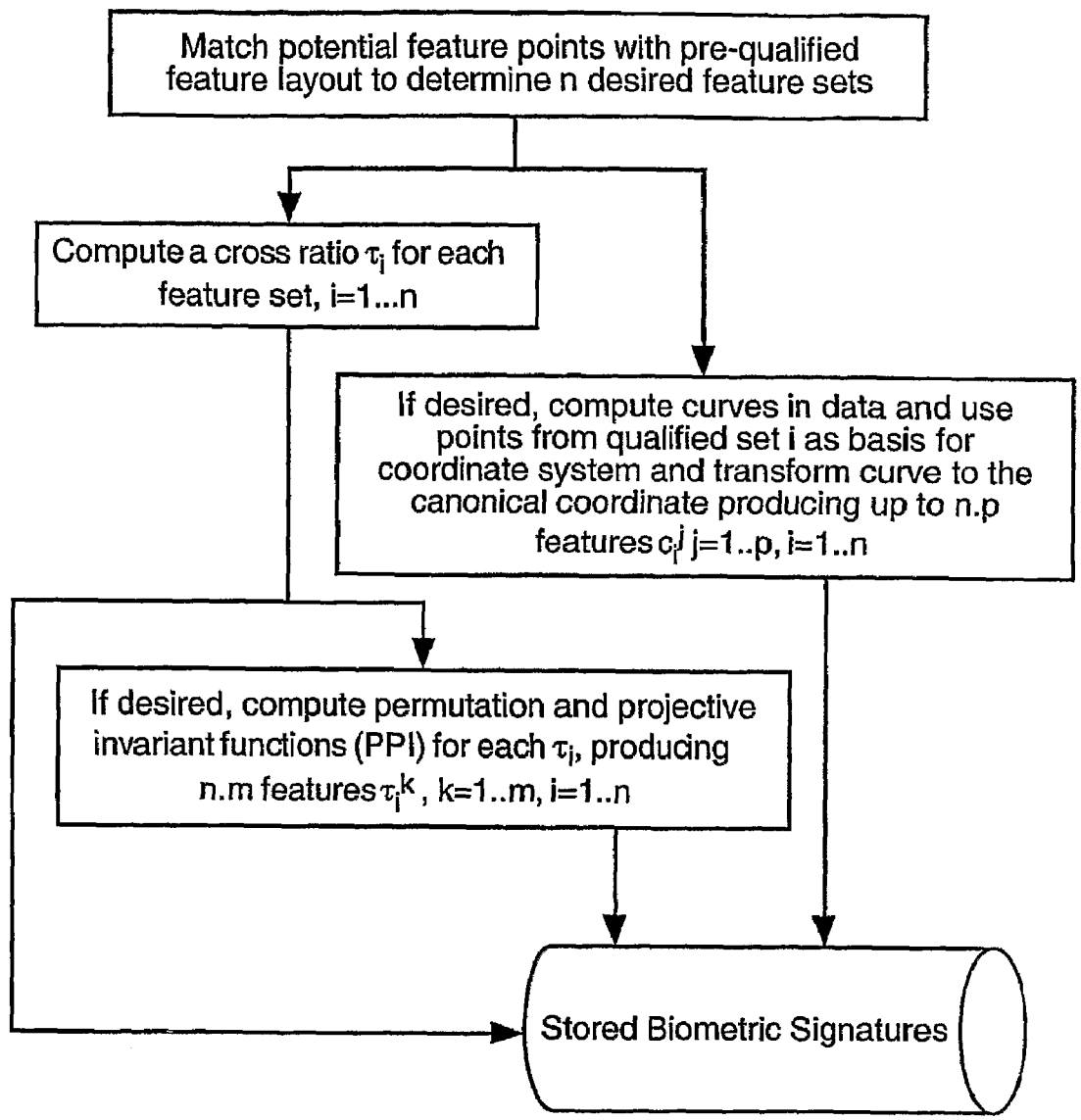
FIG. 17 shows a flow diagram of the steps in computing projective invariant-based biometric signatures, including computing cross-ratio features, PPIs and projective invariant curves.

FIG. 17 shows a flow diagram of the steps in one embodiment for computing projective invariant-based biometric signatures, including computing cross-ratio features, PPIs and projective invariant curves. The first step in this embodiment is to match the computed point sets against patters for known qualified point sets. For the hand example used as the running example, this might mean locating the general hand orientation then choosing one of the patterns shown in FIG. 10. Given the qualified point sets the computation of cross ratios τ providing n features, which can also be used to compute nm different PPI features. Four of the points of the feature set can also be used as the canonical basis to define np different curve-based invariants. In total this provides for up to n+mn+np points. While there is some redundancy in the reuse of the same points multiple times, they are used in significantly different ways thereby providing improved noise resilience and allowing for a larger feature set needed for identification rather than just verification.

Having reviewed a collection of methods for computing the projective invariants and projective quasi-invariant we review the overall operation of a system using projective-invariant based biometrics. As show in FIG. 18, the primary system operation is to capture the sensor data and compute the feature points from said data. Then a plurality of invariants or quasi-invariants, including at least one projective invariant is computed from subsets of the feature points. These quasi-invariant features are combined to form the biometric signature that can then be compared to stored signatures.

Figure 19:
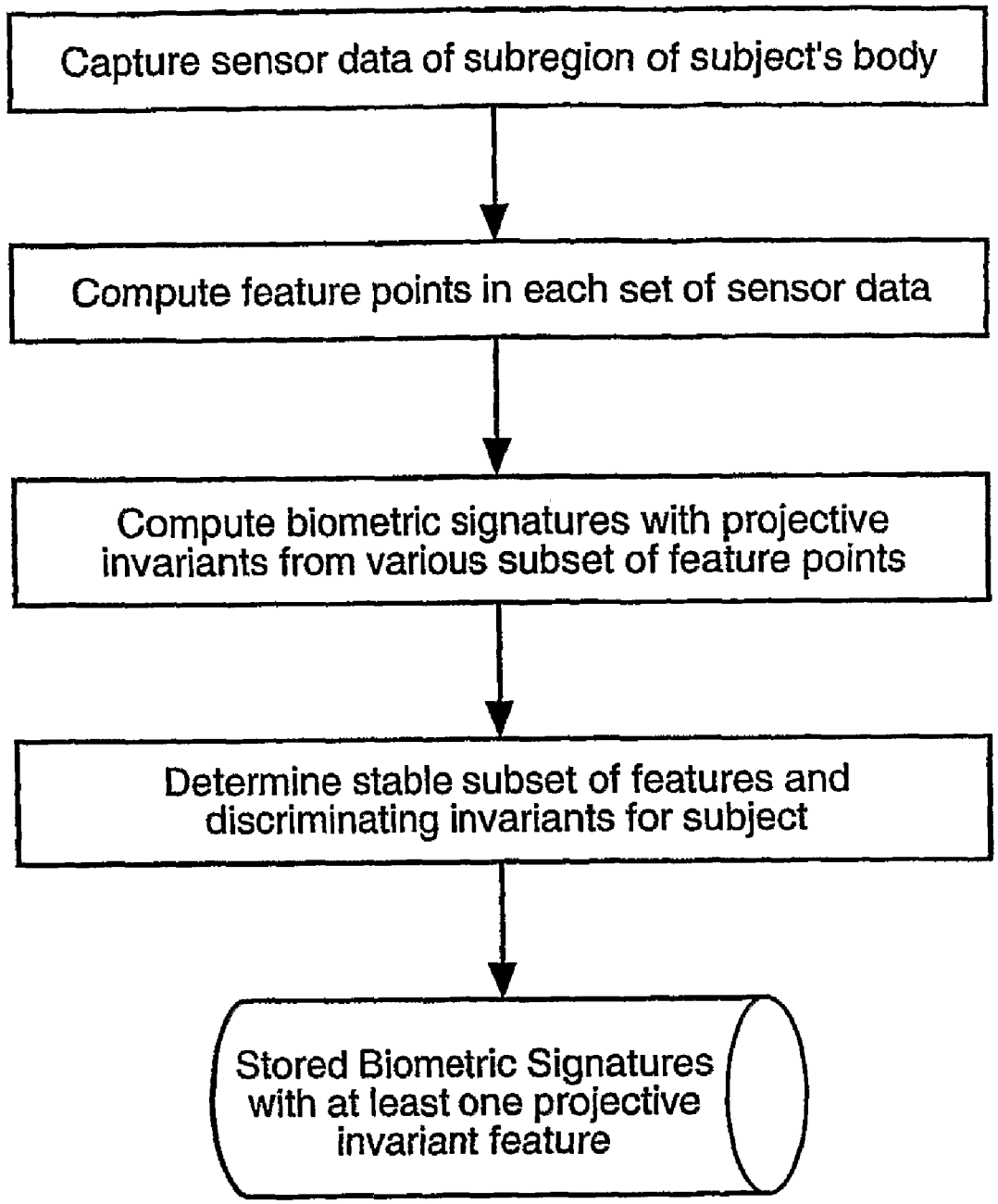
FIG. 19 shows a flow diagram of the steps in the enrollment process with projective-invariant biometric signatures.

The enrollment process, depicted in FIG. 19, is similar except that a plurality of samples are computed for the subject and then tested for stability and discriminability. Enrollment would also address issues such as missing fingers or other features. For verification, it is straightforward for each individual to have a different set of features, as the only comparison is one-to-one. For authentication/identification it is important the each subject can be compared with each entry in the database. Thus determination of which features to use could be pre-computed using a training gallery, allowing limited computation and storage, or it could a per individual weighting could be used allowing increase individualization at the cost of added storage and computation.

Figure 18:
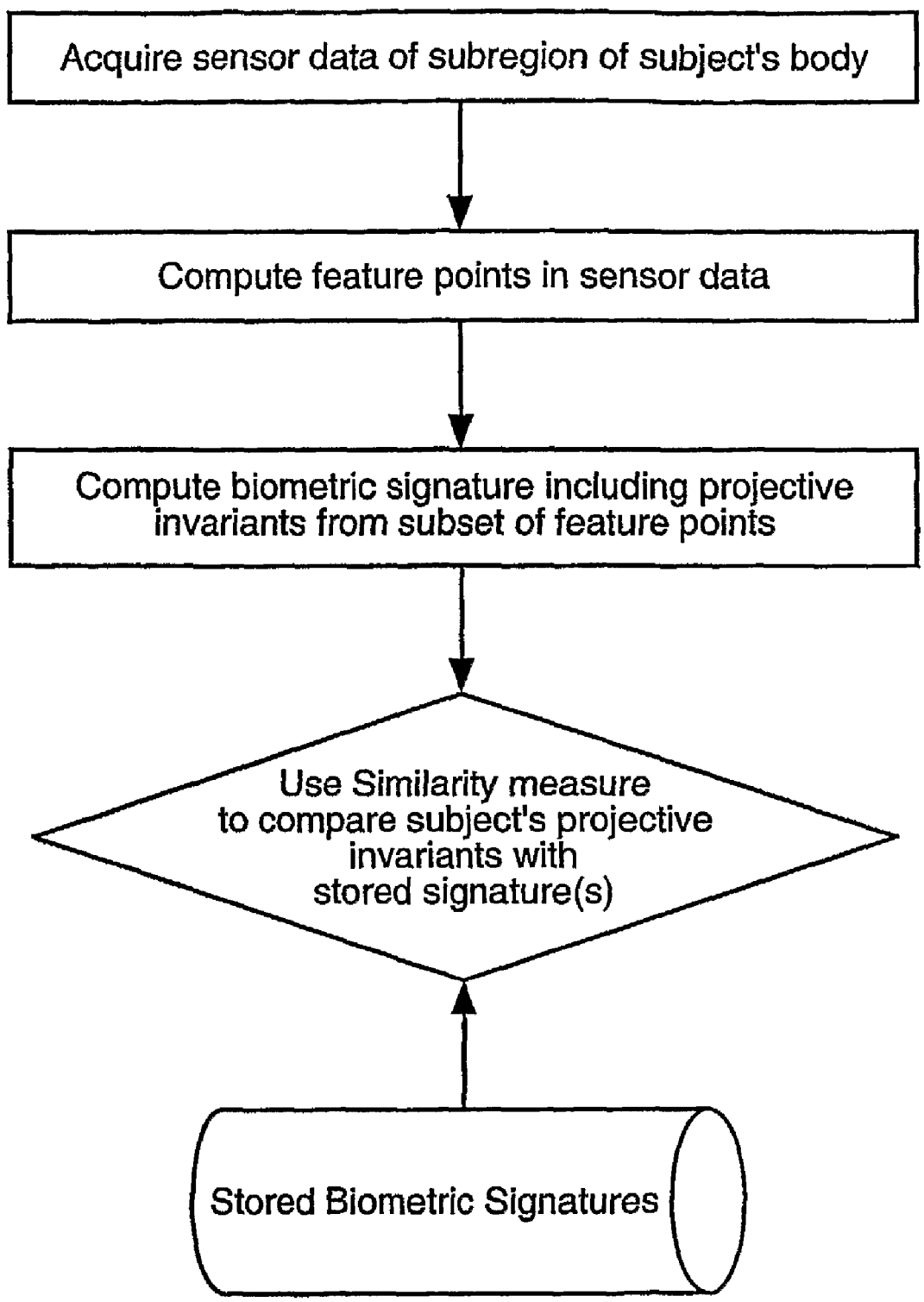
FIG. 18 shows a flow diagram of the basic steps in a system using projective invariant-based biometrics for verification of identification.
Figure 20:
FIG. 20 illustrates an imaging system view suitable for fusion of traditional face-recognition with perspective-invariant hand-geometry.

The system operation steps depicted in FIGS. 18 and 19 apply to both projective invariant features and traditional biometric features. One embodiment of the invention combines the planar projective-invariant features from a hand with the traditional biometric features from a face. A practical advantage of this multi-modal biometric is that both can be captured with a single image. The measurements from the system could be combined into a single biometric signature, or could provide two independent signatures that could be combined using any of the well-known approaches to biometric fusion, including but not limited to decision fusion, score level fusion, Borda count, Min-fusion, Max-fusion, etc. FIG. 20 shows a sketch of what an acceptable data collection for such a fusion approach might produce.

REFERENCES

[Keren-94] Daniel Keren, "Using Symbolic Computation to Find Algebraic Invariants", IEEE Trans. on Pattern Analysis and Machine Intelligence, Vol. 16, No. 11, pp. 1143-1149, 1994

[Weiss-93] Isaac Weiss, "Noise-Resistant Invariants of Curves", IEEE Trans. on Pattern Analysis and Machine Intelligence, Vol. 15, No. 9, pp. 943-948, 1993.

[Weiss-95] Isaac Weiss, "Local Projective and Affine Invariants", Annals of Mathematics and Artificial Intelligence, Vol. 13, pp. 203-226, 1995.

[Meer-et-al-98] Peter Meer, Reiner Lenz, and Sudhir Ramakrishna, "Efficient Invariant Representations", *International Journal of Computer Vision*, vol. 26, no. 2, pp. 137-152, 1998.

The invention claimed is:

1. A method of generating biometric signatures by a biometric signature system having a processor that executes the following steps, comprising the steps of:
    a) capturing an image of a hand;
    b) detecting a plurality of image features of a sub-region of the image, wherein the image features are points on creases of fingers of the hand;
    c) computing a quasi projective invariant based on a subset of the plurality of image features using cross-ratios, wherein the quasi projective invariant is a property or measurement that is resilient to rotation, translation, uniform scaling, non-uniform scaling, shear and perspective projection; and
    d) determining a similarity between the quasi projective invariant and a stored quasi projective invariant.

2. The method of claim 1, further including the steps of:
    c1) computing a plurality of quasi invariants, each of the plurality of quasi invariants based on another subset of the plurality of image features.

3. The method of claim 1, further including the steps of:
    d1) determining a similarity metric for the quasi projective invariant.

4. The method of claim 1, wherein step (c) further includes the step of:
    c1) computing a plurality of projections of a curved feature, wherein the quasi projective invariant is obtained as a plurality of coefficients of a canonical functional representation of at least one the plurality of projections.

5. The method of claim 1, further including the steps of:
    c1) detecting a second plurality of image features of a second sub-region;
    d1) computing a second quasi invariant based on a subset of the second plurality of features.

6. The method of claim 5, further including the step of:
    e) combining the quasi projective invariant and the second quasi invariant to form a biometric signature.

7. A biometric signature system, comprising:
    an imaging system capturing an image of a hand;
    a feature capturing system capturing a plurality of features from the image, wherein the features are points on creases of fingers of the hand;
    a process computing quasi invariants receiving the plurality of features and computing a quasi projective invariant using cross-ratios, wherein a quasi projective invariant is a property or measurement that is resilient to rotation, translation, uniform scaling, non-uniform scaling, shear and perspective projection; and
    a similarity computing process receiving the quasi projective invariant having an output of a score.

8. The system of claim 7, further including a biometric signature store coupled to the similarity computing process.

9. The system of claim 8, wherein the similarity computing process determines a similarity between a stored quasi projective invariant and the quasi projective invariant.

10. The system of claim 7, wherein the feature capturing system is part of the imaging system.

11. The system of claim 7, wherein the process computing quasi invariants computes a plurality of quasi invariants to form a biometric signature.

12. The system of claim 7, wherein the feature capturing system captures a first plurality of features from a first sub-region and captures a second plurality of features from a second sub-region.

13. A biometric signature method implemented by a biometric signature system having a processor that executes the following steps, comprising the steps of:
    a) capturing an image of a hand;
    b) detecting a plurality of image features from the image, wherein the image features are points on creases of fingers of the hand;
    c) calculating a projective invariant from a subset of the plurality of features using cross-ratios, wherein a quasi projective invariant is a property or measurement that is resilient to rotation, translation, uniform scaling, non-uniform scaling, shear and perspective projection; and
    d) determining a similarity between the projective invariant and a stored projective invariant.

14. The method of claim 13, wherein step (a) further includes the steps of:
    a1) enrolling the human to form the stored projective invariant.

15. The method of claim 13, wherein step (c) further includes the step of:
    c1) determining a plurality of quasi invariants from at least a portion of the plurality of features to form a biometric signature.

16. The method of claim 13, wherein step (d) further includes the step of:
  d1) comparing a biometric signature to a stored biometric signature.

17. The method of claim 13, wherein step (c) further includes the step of;
  c1) computing a plurality of projections of a curved feature, wherein the quasi projective invariant is obtained as a plurality of coefficients of a canonical functional representation of at least one the plurality of projections.

* * * * *